Inventor
Paul E. Hawkinson
By his Attorneys
Merchant & Merchant

Patented July 29, 1952

2,605,199

UNITED STATES PATENT OFFICE 2,605,199

METHOD OF PRODUCING SKID-RESISTANT TREADS FOR PNEUMATIC TIRES

Paul E. Hawkinson, Minneapolis, Minn., assignor to Paul E. Hawkinson Company, Minneapolis, Minn., a corporation of Minnesota Application November 16, 1949, Serial No. 127,750

2 Claims. (Cl. 154—14)

My invention relates to a novel method of producing skid-resistant treads for pneumatic tires and, more particularly, to production of such treads which are true and of maximum efficiency from the time they are first put into use.

It is common practice today to completely imbed endless wire coils within the treads of pneumatic tires for the purpose of increasing the skid resistance of such treads to road surfaces made slippery through moisture, ice and the like. However, I have found that such coils do not immediately become effective as gripping elements—in fact, they do not become effective until the entire tread in which they are imbedded becomes sufficiently well worn down to form a plurality of disconnected, circumferentially-spaced U-shaped gripping elements. This is obviously objectionable due to the fact that the user normally does not put such skid-resistant tires on his car until he has need for them, and the tires are not efficient for this purpose until long after the need has passed.

To obviate this difficulty I have developed a novel tire treading method and mold whereby circumferentially-extended wire coil-receiving and centering channels therein, effectually project the convolution of the wire coil outwardly of the normal road-engaging surface of the tread in which they are imbedded during vulcanizing of the rubber-like strip material to the tire. The effect of this is to subject the wire coil (and its individual convolutions) to wear prior to the tread in which it is imbedded. However, even this method has had some drawbacks, namely, the convolutions of the wire coil, prior to their being worn to spaced claw-like points, are extremely slippery and, furthermore, many of the convolutions are broken by impact with rough surfaces so as to become dislodged.

The primary object of my invention is to eliminate all of the above difficulties and to produce a tire which will perform at its maximum in respect to skid resistance from the first time it is placed upon the wheel of a vehicle. This I have found can only be accomplished by first vulcanizing the new strip of tread material to the worn tire with a coil of wire partially imbedded therein in such a manner as to form an endless radially projecting rib of rubber-like material and wire on the road engaging surface produced. The coil of wire is thus spaced from the transverse sides of the tread, with the radially outermost portion of each convolution projecting outwardly from the normal road-engaging surface of the tread within the rib for a distance equal to the thickness of the wire, and, thereafter and prior to the tires being placed upon the road, cutting or abrading away the rib to a depth equal to the radially-projected portions of each of such convolutions, i. e. to the level of the normal road-engaging surface of the tread.

A still further object of my invention is a method of the type above-described, wherein a highly efficient skid-resistant tire may be produced with a minimum of abrading or grinding and with a minimum of loss of rubber due to such grinding. This, I have found, may be accomplished by projecting each convolution radially outwardly from the road-engaging surface of the tread an extent approximately equal to the thickness of the wire from which the coil is formed and cutting off said projecting wire portions.

The above and still further objects and advantages of my novel method will become apparent from the following detailed specification, appended claims, and attached drawings.

Referring to the drawings, wherein like characters indicate like parts throughout the several views.

Figures 1, 2, 3, 4, 5:
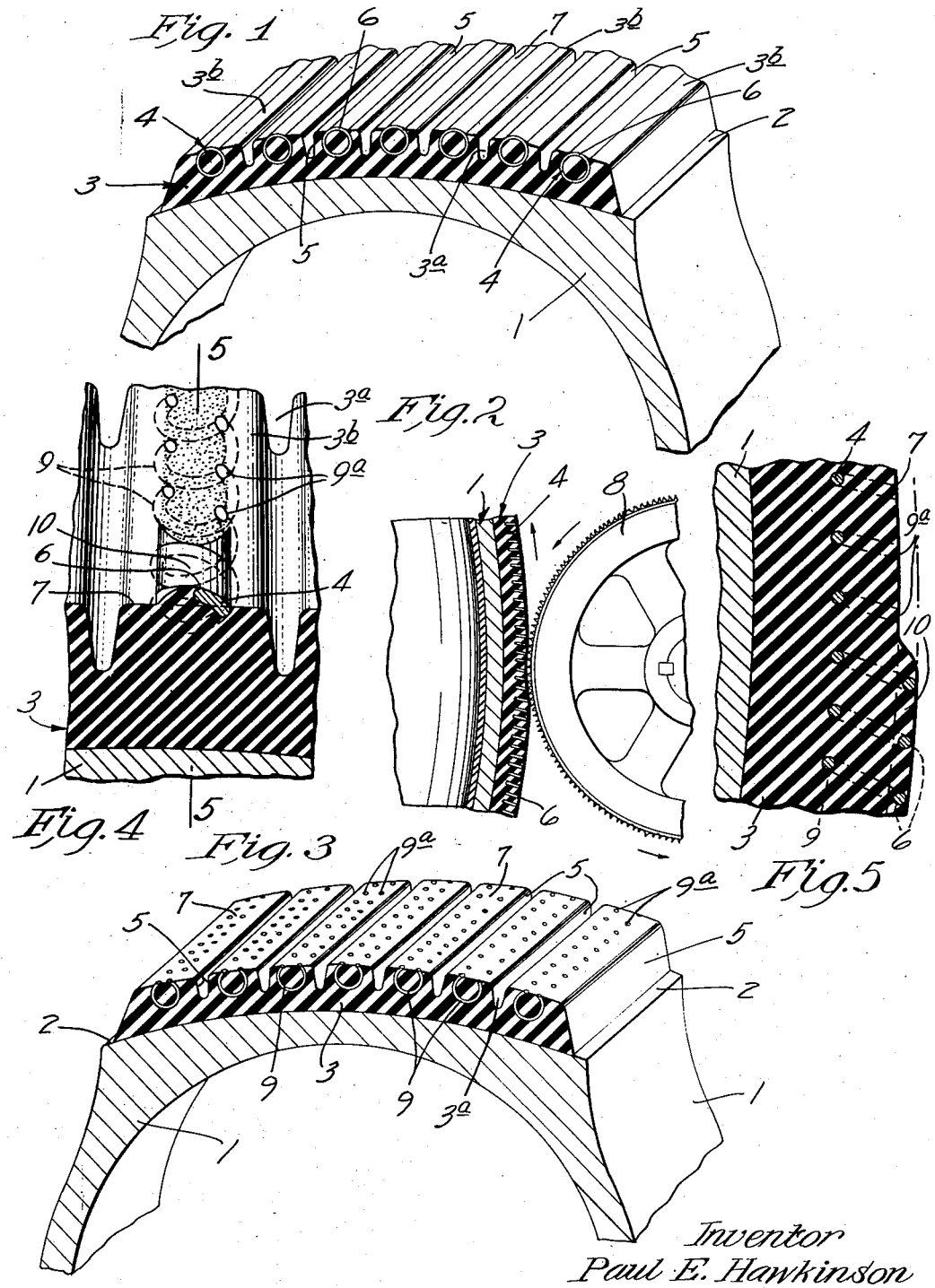
Fig. 1 is a fragmentary perspective view of a section of a worn pneumatic tire casing having a new tread applied thereto in accordance with the first step in my novel process and showing the coil carrying ribs projecting beyond each road engaging tread portion.
Fig. 2 is a fragmentary view in circumferential section of a tire casing illustrating the second step in my novel process of cutting away the projecting ribs to a depth equal to the thickness of the imbedded wire.
Fig. 3 is a view corresponding to Fig. 1, but illustrating the finished product.
Fig. 4 is an enlarged fragmentary and composite view of the structures illustrated more or less diagrammatically in Figs. 1 and 3.
Fig. 5 is a section taken on line 5—5 on Fig. 4.

Referring with greater particularity to the drawings, the numeral 1 indicates a pneumatic tire casing, to the worn engaging surface 2 of which a new tread 3, having in its road engaging tread a plurality of endless circumferentially-extending grooves 3a, has been applied. Insofar as this particular invention is concerned, it is of no particular importance what precise curing mold or method is utilized in applying the tread 3 to the worn surface 2. However, it will be noted that each of the road engaging tread portions 3b (see Fig. 1) has imbedded therein an endless coil of wire 4 which is inwardly-spaced from the transverse sides 5 of the tread portions; and the radially outermost portions 6 of each convolution of each wire coil 4 projects outwardly from the normal road-engaging surface 7 forming with the tread material an endless radially projecting rib 10 on said surface in which it is imbedded substantially the thickness of the wire from which the coil 4 is formed. The wire coils 4 may be so positioned in accordance with the combined teachings of my United States Patent No. 2,476,146 and my copending application for patent, S. N. 15,792, filed March 19, 1948, and entitled "Tire Tread and Mold for Making Same."

As illustrated in Fig. 2, the tire casing is then suitably mounted so as to rotate the peripheral ribbed portions 10 of the road engaging tread portions 3b in contact with an abrasive or grinding wheel 8. By this method, the radially-projected rib portion 10 and imbedded projecting portions 6 of each convolution of the wire coil 4 are abraded away to a level of the normal road-engaging tread surface 7 as shown in more detail in Figs. 4 and 5, whereby to produce a plurality of circumferentially-spaced U-shaped gripping claws 9, the free ends 9a of which are substantially flush with the normal road-engaging surface 7. Because of the fact that the portion 6 of each convolution of the wire coil 4 initially projects radially outwardly from the normal road-engaging tread surface 7 only substantially the thickness of the wire from which the coils 4 are formed, it should be obvious that only a minimum amount of grinding of the wire coil and a minimum loss of rubber is necessary in order to produce the highly efficient and unbroken U-shaped gripping claws 9.

It should likewise be obvious that a tire produced according to the above method has its greatest efficiency when first placed upon the road and that this efficiency will be maintained for the greater portion of the life of the tread without fear of breaking the claws 9.

I claim:

1. The method of producing a skid-resistant tread for a pneumatic tire which comprises, attaching an endless strip of rubber-like material to the worn peripheral surface of said tire to provide a road engaging surface, partially imbedding an endless coil of wire in said tread strip to project radially therefrom during vulcanization thereof, and thereafter cutting away the radially projecting portion of each convolution of the wire coil extending outwardly from the normal road engaging surface of said strip, whereby to provide a road-engaging surface having two rows of circumferentially and laterally spaced road gripping elements arranged flush with said road engaging surface.

2. The method of producing a skid-resistant tread for a pneumatic tire which comprises, attaching an endless strip of rubber-like material to the worn peripheral surface of said tire to provide a road engaging surface, forming an endless radially projecting rib on said surface by partially imbedding an endless coil of wire in said tread strip during vulcanizing thereof on said tire, and thereafter cutting away said rib to a depth equal to the thickness of the wire, whereby to provide a road-engaging surface having two rows of circumferentially and laterally spaced road gripping elements arranged flush with said road engaging surface.

PAUL E. HAWKINSON.

REFERENCES CITED

The following references are of record in the file of this patent:

UNITED STATES PATENTS

| Number | Name | Date |
| --- | --- | --- |
| Re. 23,235 | Hawkinson | May 30, 1950 |
| 2,006,038 | Yamaki | June 25, 1935 |
| 2,271,130 | Pearson | Jan. 27, 1942 |
| 2,294,047 | Pollock | Aug. 25, 1942 |
| 2,297,354 | Hawkinson | Sept. 29, 1942 |
| 2,366,685 | Chambers | Jan. 2, 1945 |
| 2,476,146 | Hawkinson | July 12, 1949 |

OTHER REFERENCES

Scientific American, "Non Skid," May 1943, pp. 224–5.